United States Patent Office 2,818,137
Patented Dec. 31, 1957

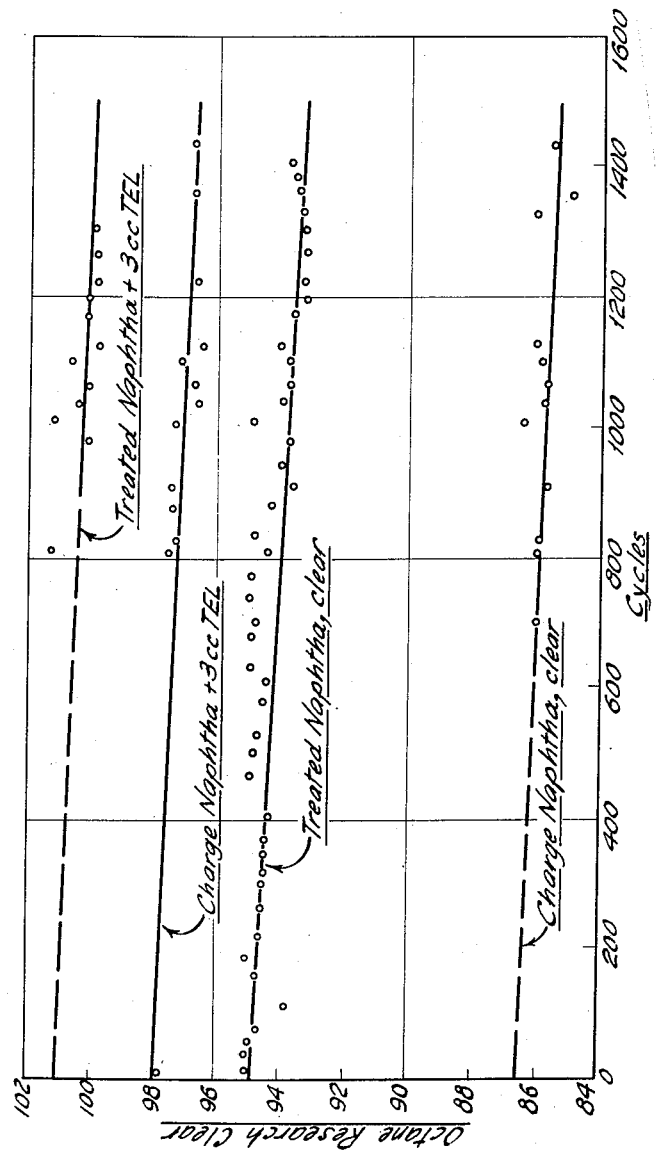

2,818,137
ADSORPTIVE SEPARATION PROCESS

Robert C. Richmond, Lawrence F. Marsch, Roland F. Huhndorff, John K. McKinley and Hyman D. Massin, Port Arthur, Tex., assignors to The Texas Company, New York, N. Y., a corporation of Delaware Application October 24, 1955, Serial No. 542,152

13 Claims. (Cl. 183—114.2)

This invention relates to the separation of gaseous or vaporized mixtures. More particularly, this invention relates to a process for the separation of gaseous or vaporized mixtures by employing a solid adsorbent which selectively adsorbs at least one of the components making up the mixture to be separated.

Various solid adsorbents have been proposed to effect the fractionation of gaseous or vaporized mixtures. For example, molecular sieve type adsorbents have been proposed to effect a separation of one component from a mixture containing the same, e. g., to effect the separation of straight chain hydrocarbons from a vaporized petroleum naphtha containing straight chain hydrocarbons, such as n-paraffins, and non-straight chain hydrocarbons, such as isoparaffins, naphthenes and aromatic hydrocarbons. It has been observed that in an adsorptive separation process employing an alumino-silicate molecular sieve type solid adsorbent for the adsorptive separation of one molecular type, such as straight chain hydrocarbons, from another molecular type, such as non-straight chain hydrocarbons, eventually, after a number of repetitive adsorption desorption operations, the adsorptive capacity of the adsorbent decreases. It is believed that the observed decrease in adsorptive capacity is due to the deposition or plugging of the active adsorptive sites or pores on the adsorbent by solid carbonaceous material which accumulates or which appears to steadily build up after a number of adsorption desorption operations have been carried out. It has been observed that eventually the adsorbent becomes substantially completely depleted or inactivated due to the deposition of this carbonaceous material. When this condition is attained the adsorbent must be regenerated or replaced with fresh adsorbent.

Regeneration of an alumino-silicate molecular sieve type adsorbent, such as an adsorbent which selectively adsorbs straight chain hydrocarbons to the substantial exclusion of non-straight chain hydrocarbons, is not an easy matter. Solvent regeneration, i. e., washing the accumulated carbonaceous material from the adsorbent, is not entirely satisfactory. Burning of the accumulated carbonaceous material from the adsorbent, although theoretically possible, in practice is a hazardous operation since alumino-silicate sieve type adsorbents are temperature sensitive at high temperatures, such as a temperature somewhat above about 1100° F. If the critical temperature is exceeded the adsorptive capacity of the adsorbent is permanently destroyed, presumably due to collapse of the porous crystal structure or crystal lattice.

Accordingly, it is an object of this invention to provide an improved method for the adsorptive separation of gaseous or vaporized mixtures.

Another object of this invention is to provide an adsorptive separation process wherein the life of the adsorbent employed therein is substantially indefinitely extended.

Yet another object of this invention is to provide an adsorptive separation process employing an alumino-silicate molecular sieve type adsorbent whereby deposition or accumulation of solid carbonaceous materials on the active adsorbent material is substantially eliminated or obviated.

Still another object of this invention is to provide a method whereby the accumulation or deposition of solid carbonaceous materials on alumino-silicate molecular sieve type solid adsorbents employed in an adsorptive separation process is eliminated or obviated.

How these and other objects of this invention are attained is apparent with reference to the accompanying disclosure.

In at least one embodiment of this invention at least one of the foregoing objects will be achieved.

In accordane with one practice of this invention in an adsorptive separation process wherein a gaseous or vaporized mixture is contacted with a solid selective adsorbent which selectively adsorbs one component of the mixture, followed by desorption of the adsorbed component and wherein as a result of the foregoing adsorption desorption operations solid carbonaceous material tends to build up or to accumulate on the selective adsorbent, improved results are obtained, as evidenced by a decrease in the amount of said solid carbonaceous material which tends to build up or accumulate on said adsorbent, by contacting said vaporized mixture with a solid treating material or agent, such as activated alumina, which serves to remove those materials from said mixture undergoing separation which tend to deposit or lead to the accumulation of said carbonaceous material on said adsorbent. As a result of thus treating or contacting the gaseous or vaporized mixture to be fractionated those compounds therein, such as oxygenated hydrocarbons, polar compounds, such as sulfur-containing and nitrogen-containing hydrocarbon derivatives, as well as higher molecular weight hydrocarbons, which appear to tend to lay down (by polymerization and/or decomposition) solid carbonaceous material on the selective adsorbent are taken up and removed from the mixture prior to contact with the selective adsorbent. These solid carbonaceous-forming materials do not contact the selective adsorbent and therefore are not adsorbed thereon to any significant extent, as a result accumulation or deposition of solid carbonaceous material on the selective adsorbent is substantially eliminated.

Instead of activated alumina, which is preferred in the practice of this invention, any other suitable treating agent which is selective for solid, carbonaceous-forming compounds, such as oxygenated hydrocarbons, e. g. hydroperoxides, sulfur and nitro-containing derivatives of hydrocarbons, and relatively higher molecular weight hydrocarbons, cyclic and aliphatic, may be employed in the practice of this invention. Suitable treating agents include activated carbon, silica gel, and the various activated clays such as a commercially-available clay sold under the trade name, "Florex."

Any selective adsorbent can be suitably employed as the solid selective adsorbent in the practice of our invention. The practice of our invention, however, is particularly applicable to solid adsorbents of the molecular sieve type, particularly the alumino-silicate molecular sieve type adsorbents. By molecular sieve type adsorbent is meant that class of selective adsorbents which selectively adsorbs a component according to molecular type or configuration, based upon some critical molecular dimension, to the substantial exclusion of other molecular types or configurations. Particularly applicable to the use of the practice of this invention are those alumino-silicate molecular sieve type adsorbents which selectively adsorb straight chain hydrocarbons to the substantial exclusion of the non-straight chain hydrocarbons. A particularly suitable solid adsorbent of this character and one which evidences a selectivity for straight chain hydrocarbons (n-paraffins and n-olefins) is a calcium alumino-silicate, apparently actually a sodium calcium alumino-silicate, manufactured by Linde Air Products Company and designated Linde Type 5A Molecular Sieve. The porous crystals of this particular calcium alumino-silicate have a uniform pore size or diameter of about 5 Angstrom units, a pore size sufficiently large to admit one molecular type, straight chain hydrocarbons, such as the normal paraffins and the normal olefins, to the substantial exclusion of other molecular types, such as the non-straight chain isoparaffinic, naphthenic, iso-olefinic and aromatic hydrocarbons which possess a critical molecular dimension greater than 5 Angstroms and accordingly do not penetrate the pores of the adsorbent. This particular selective adsorbent is commercially-available in various sizes, in pelleted or powder form.

Other suitable alumino-silicate molecular sieve type selective adsorbents include the synthetic zeolites which, when dehydrated, may be described as crystalline zeolites having a rigid three dimensional anionic network and having interstitial dimensions sufficiently large to adsorb one type of component to the substantial exclusion of another type of component. The naturally occurring zeolite, chabazite, exhibits such desirable properties in that it selectively adsorbs straight chain hydrocarbons to the substantial exclusion of non-straight chain hydrocarbons. Another suitable naturally occurring zeolite is analcite $NaAlSi_2O_6 \cdot H_2O$ which, when dehydrated, and when all or part of the sodium is replaced by an alkaline earth metal, such as calcium, by base exchange yields a material which may be represented by the formula $$(Ca,Na)Al_2Si_4O_{12} \cdot 2H_2O$$

and which after conditioning will adsorb one molecular type, such as straight chain hydrocarbons, to the substantial exclusion of other molecular types, such as non-straight chain hydrocarbons. Naturally occurring and synthetically prepared phacolite, gmelinite, harmotome and the like or suitable base exchange modifications of these zeolites are also useful as selective adsorbents.

The vapor phase adsorption in an adsorptive separation process in accordance with this invention is carried out at any suitable temperature and pressure at which the vaporized feed mixture undergoing adsorptive separation or fractionation is maintained in the vapor or gaseous phase. Selective adsorption has been carried out at a temperature in the range 50–700° F. and higher and at a pressure in the range 0–1000 p. s. i. g., the temperature and pressure being adjusted with respect to the gaseous or vaporized mixture undergoing treatment so as to maintain the mixture in the gaseous phase during the adsorptive separation operation. When fractionating the hydrocarbon mixture by adsorptive separation it is preferred to carry out the adsorption operation at a temperature in the range 300–700° F.

The desorption of the selectively adsorbed component can be made at any suitable temperature and pressure, the temperature and pressure being adjusted so that the resulting desorbent material is in the vapor or gaseous phase. Generally, as indicated, any suitable desorption temperature may be employed in an adsorption desorption process in accordance with this invention. It is sometimes desirable to carry out isothermal and/or isobaric adsorption desorption operations. It is preferred, however, to carry out the desorption operation at a relatively elevated temperature, such as a temperature in the range 400–900° F., usually at a temperature in the range 100–300° F. higher than the adsorption temperature. The desorption temperature should not be excessively high, for example, not greater than about 1100–1300° F. in the case of Linde Type 5A Molecular Sieve, since such excessive temperatures lead to the destruction of the adsorbent material.

Although the desorption operation may be carried out by a mere application of heat alone, it is preferred to carry out the desorption operation by employing a gaseous or vaporized desorbing agent or stripping medium. Any suitable gaseous stripping medium may be employed in the practice of this invention. The following materials may be employed as the gaseous stripping medium; nitrogen, methane, ethane, propane, hydrogen, carbon dioxide, carbon monoxide, flue gas, natural gas, $C_4$ hydrocarbons such as butane and/or isobutane or mixtures thereof. In general, any gaseous or vaporized material which is readily separable, such as by distillation, from the material being desorbed (desorbate) and which is chemically inert with respect to the selective adsorbent under the conditions of desorption is suitable as a stripping medium.

Although the practice of this invention is applicable to the adsorptive separation of any gaseous or vaporized mixture containing materials which tend to lay down solid carbonaceous matter on the selective adsorbent during repetitive adsorption desorption operations, it is particularly applicable to the treatment of hydrocarbon fractions, such as petroleum fractions and hydrocarbon synthesis (Fischer-Tropsch) fractions, for the adsorptive separation of one or more components therefrom. This invention is particularly suitable for the treatment of hydrocarbon fractions containing straight chain and non-straight chain hydrocarbons, particularly those fractions wherein the amount of straight chain hydrocarbons is substantial, e. g., in the range 2–30% by volume and higher, to effect the removal of straight chain hydrocarbons therefrom, thereby upgrading the thus-treated hydrocarbon fraction as a motor fuel, as evidenced by octane number increase.

Generally, hydrocarbon mixtures which are suitably fractionated in the vapor phase selective adsorption operation in accordance with this invention include the various petroleum fractions such as a naphtha fraction, a diesel oil fraction, a kerosene fraction, a gas oil fraction, and the like. Particularly suitable for treatment are straight chain hydrocarbon-containing fractions having a boiling point or boiling range in the range 40–600° F. and higher and containing a substantial amount of straight chain hydrocarbons. More particularly, a petroleum fraction suitable for use in the practice of this invention might have an initial boiling point in the range 40–300° F. and an end point in the range 150–600° F. A petroleum fraction suitable for use in the practice of this invention might have the following composition:

| Hydrocarbon type: | Percent by volume |
|---|---|
| Naphthenes | 0–75 |
| Aromatics | 0–60 |
| Acyclic saturates (including normal paraffins and isoparaffins) | 2–90 |
| Acyclic unsaturates (including normal olefins and isoolefins) | 0–50 |

Typical refinery stocks or fractions which are applicable in the practice of this invention are a wide boiling straight run naphtha, a light straight run naphtha or a light catalytically reformed naphtha having an end point not substantially greater than 225° F., a heavy straight run naphtha, a catalytically cracked naphtha, a thermally cracked or thermally reformed naphtha, a catalytically reformed naphtha and the like.

In accordance with still another embodiment of the practice of this invention the selective adsorbent, after having been subjected to a number of adsorption desorption cycles, is periodically purged or depleted of any residual adsorbed material, particularly adsorbed material which might eventually lead to the deposition or accumulation of solid carbonaceous material, by relatively prolonged contact at a relatively elevated temperature, in the range 700–1000° F., with a gaseous desorbing or stripping medium which desirably is the same gaseous stripping medium employed during the desorption operations to desorb the adsorbed material from the adsorbent, thereby substantially completely regenerating the adsorbent prior to contact with additional vaporized fresh feed mixture. It has been observed that prolonged high temperature purging removes or reduces to a minimum, about 0.6% by wt. carbon (as determined by the Leco method) based on the adsorbent, the amount of solid carbonaceous matter deposited and retained on the adsorbent. Preferably the gaseous desorbing medium is a saturated, aliphatic low molecular weight hydrocarbon, such as methane, ethane, propane and the like. The periodic purging of the selective adsorbent is carried out at a relatively elevated temperature, such as a temperature of at least about 700° F., preferably about 800° F., and for a sufficient length of time to substantially completely deplete or purge any previously adsorbed material from the selective adsorbent and/or to substantially completely remove any solid carbonaceous material or compounds which tend to form solid carbonaceous material which have accumulated or have been deposited on the adsorbent. Desirably, and preferably, in accordance with our invention the pretreatment of the gaseous or vaporized feed mixture undergoing fractionation with a special treating agent, such as activated alumina, together with periodically purging the selective adsorbent of solid carbonaceous material or of accumulated or adsorbed material which intend to lead to the formation of solid carbonaceous material, are carried out in combination with each other. When the above-mentioned pretreatment step and periodic high temperature purging of the selective adsorbent are employed in combination the effective life of the selective adsorbent can be extended substantially indefinitely with no apparent loss in adsorptive capacity.

The following is illustrative of the practice of this invention and clearly shows how the effective life of a selective adsorbent is substantially indefinitely extended by applying the practices of this invention. A container (adsorber) was loaded with 500 ccs. of a sodium calcium alumino-silicate, Linde Type 5A Molecular Sieve, (1/16 inch pellets) and 350 ccs. particle-form activated alumina was placed on top of the aforementioned alumino-silicate selective adsorbent as a pretreatment bed. Freshly-distilled nitrogen-blanketed catalytically reformed gasoline (Platformate) was passed downwardly through the reactor at a temperature of 625° F., a pressure of 60 p. s. i. g. and at a space velocity of 0.5 v./h./v. for 30 minutes, a rate of 250 ccs. an hour, and the resulting treated gasoline, now substantially free of straight chain hydrocarbons, was recovered as product. At the end of 30 minutes the adsorber was purged for 3 minutes with natural gas comprising predominantly methane and a small amount of ethane and propane at a temperature of about 625° F. and at a rate of 24 cu. ft. per hour. The resulting purged material was collected with the product. Following this purge the alumino-silicate adsorbent was contacted for 27 minutes with a stream of the above-mentioned natural gas at about 625° F. and at a rate of 24 cu. ft. per hour and the resulting desorbed material, straight chain hydrocarbon desorbate, was separately collected. The above operations of adsorption desorption constitute one cycle. These operations were then continuously repeated. Periodically, after about 120 cycles, 200 ccs. of the alumina were removed from the top of the alumina pretreatment bed and replaced with a like amount of fresh activated alumina. The adsorber was then heated to a temperature of 800° F. and natural gas at 800° F. was passed therethrough at a rate of 24 cu. ft. per hour at atmospheric pressure for about 4 hours. After this high temperature purging period, which effectively removed any residual adsorbed material from the alumino-silicate selective adsorbent, the adsorber was returned to the cyclic adsorption desorption operations. The above operations were carried out for an extended period of time, for at least 2000 cycles, intermittently or periodically, once a week, purging the alumino-silicate adsorbent with a high temperature natural gas stream comprised mainly of methane. By operating in this manner the life of the alumino-silicate selective adsorbent was substantially indefinitely extended and its adsorptive capacity or efficiency maintained substantially unchanged, that is, the adsorptive capacity of the alumino-silicate selective adsorbent at the end of the 2000 cycles was substantially the same as its adsorptive capacity at the end of cycle number one. That the effective life of a selective adsorbent can be substantially indefinitely extended when employed in accordance with the practice of this invention is indicated by the accompanying drawing which graphically illustrates that the effectiveness or adsorptive capacity of the alumino-silicate selective adsorbent remains unchanged even after 1400 cycles and more, as indicated by a substantially constant octane number differential between the charge stock, a catalytically reformed naphtha, prior to treatment and after treatment.

As indicated in the foregoing example, one feature of the practice of this invention involves employing a freshly distilled or produced petroleum fraction or one which has been maintained in an atmosphere substantially free of molecular oxygen. A suitable blanketing gas besides nitrogen would be natural gas, comprising methane and/or ethane and propane, carbon dioxide, carbon monoxide or flue gas substantially free of molecular oxygen. It is desirable to exclude free oxygen from contact with the petroleum fraction to be fractionated in order to obviate or reduce the presence or formation of oxygenated hydrocarbons therein, such as hydroperoxides, which appear to or which tend to lead to the deposition of solid carbonaceous material on the selective adsorbent.

As will be apparent to those skilled in the art in the light of the foregoing disclosures many changes, substitutions and modifications are possible without departing from the spirit or scope of this invention.

We claim:

1. A method of separating straight chain hydrocarbons from non-straight chain hydrocarbons contained in a vaporized hydrocarbon mixture, which comprises subjecting said vaporized hydrocarbon mixture to contact with activated alumina, subsequently contacting the thus-treated hydrocarbon mixture with a solid selective adsorbent which selectively adsorbs straight chain hydrocarbons to the substantial exclusion of non-straight chain hydrocarbons to adsorb straight chain hydrocarbons from said mixture, desorbing the adsorbed straight chain hydrocarbons from said adsorbent and periodically contacting said adsorbent with methane at an elevated temperature of at least about 700° F.

2. A process for upgrading a petroleum catalytic reformate as evidenced by an increase in octane number which comprises excluding said reformate from contact with molecular oxygen, vaporizing said reformate, contacting said vaporized reformate with activated alumina, subsequently subjecting said reformate to contact with a solid, alumino-silicate molecular sieve type selective adsorbent which selectively adsorbs straight chain hydrocarbons to the substantial exclusion of non-straight chain hydrocarbons to adsorb straight chain hydrocarbons from said reformate, desorbing the adsorbed straight chain hydrocarbons from said adsorbent and periodically contacting said adsorbent at an elevated temperature, at least 700° F., with a stream of normally gaseous hydrocarbons to maintain said adsorbent at or to restore said adsorbent to substantially its original adsorptive capacity.

3. A hydrocarbon treating process for upgrading a petroleum catalytic reformate as evidenced by an increase in octane number which comprises excluding said reformate from contact with an atmosphere containing a substantial amount of molecular oxygen, vaporizing said reformate, contacting the thus-vaporized reformate with activated alumina, subsequently contacting said reformate with a solid alumino-silicate, molecular sieve type adsorbent which selectively adsorbs straight chain hydrocarbons to the substantial exclusion of non-straight chain hydrocarbons to adsorb straight chain hydrocarbons from said reformate, desorbing the adsorbed straight chain hydrocarbons from said adsorbent, repeating the aforesaid adsorption and desorption operations and periodically contacting said adsorbent at a temperature of at least 800° F. with methane to maintain said adsorbent at substantially its original adsorptive capacity.

4. A method of separating straight chain hydrocarbons from non-straight chain hydrocarbons contained in a vaporized hydrocarbon mixture which comprises subjecting said vaporized hydrocarbon mixture to contact with an alumino-silicate molecular sieve type adsorbent which selectively adsorbs straight chain hydrocarbons to the substantial exclusion of non-straight chain hydrocarbons, to adsorb straight chain hydrocarbons from said mixture, desorbing the adsorbed straight chain hydrocarbons from said adsorbent, repeating the aforesaid adsorption desorption operations and periodically contacting said adsorbent with methane at a temperature of at least about 700° F., whereby solid carbonaceous material which tends to be deposited on said adsorbent as a result of the aforesaid adsorption desorption operations, which solid carbonaceous material tends to decrease the adsorptive capacity of said adsorbent, is avoided or removed and said adsorbent restored to or maintained at its original adsorptive capacity.

5. A process in accordance with claim 4 wherein said selective adsorbent is a calcium alumino-silicate.

6. A process in accordance with claim 4 wherein said selective adsorbent is a sodium calcium alumino-silicate.

7. A process which comprises contacting a vaporized petroleum fraction containing straight chain hydrocarbons and non-straight chain hydrocarbons with activated alumina, subsequently contacting said reformate with an alumino-silicate molecular sieve type selective adsorbent which selectively adsorbs straight chain hydrocarbons to the substantial exclusion of non-straight chain hydrocarbons to adsorb straight chain hydrocarbons, desorbing the adsorbed straight chain hydrocarbons from said adsorbent, repeating the aforementioned adsorption desorption operations and periodically contacting adsorbent at a temperature of at least 700° F. with methane for a sufficient period of time to restore or maintain said adsorbent at its original adsorptive capacity.

8. A method in accordance with claim 7 wherein said adsorbent is a calcium alumino-silicate.

9. A method in accordance with claim 7 wherein said adsorbent is a sodium calcium alumino-silicate.

10. A method for treating a petroleum naphtha containing straight chain hydrocarbons and non-straight chain hydrocarbons which comprises excluding said naphtha from contact with molecular oxygen, contacting said naphtha in the vapor phase with activated alumina, subsequently contacting said naphtha with a solid alumino-silicate molecular sieve type selective adsorbent which selectively adsorbs straight chain hydrocarbons to the substantial exclusion of non-straight chain hydrocarbons to adsorb straight chain hydrocarbons from said naphtha, desorbing the adsorbed straight chain hydrocarbons from said adsorbent, repeating the aforementioned adsorption desorption operations and periodically contacting said adsorbent with methane at a temperature of at least 700° F. whereby solid carbonaceous material which tends to be deposited on said adsorbent as a result of the aforesaid adsorption desorption operations, which solid carbonaceous material tends to decrease the adsorptive capacity of said adsorbent, is avoided or removed and said adsorbent restored to or maintained at its original adsorptive capacity.

11. A method in accordance with claim 10 wherein said naphtha is a catalytic reformate.

12. A method in accordance with claim 10 wherein said selective adsorbent is a calcium alumino-silicate.

13. A method in accordance with claim 10 wherein said selective adsorbent is a sodium calcium alumino-silicate.

References Cited in the file of this patent

UNITED STATES PATENTS

| | | |
|---|---|---|
| 2,306,610 | Barrer | Dec. 29, 1942 |
| 2,632,726 | Ringham et al. | Mar. 24, 1953 |
| 2,684,731 | Starr et al. | July 27, 1954 |